Figure 1:
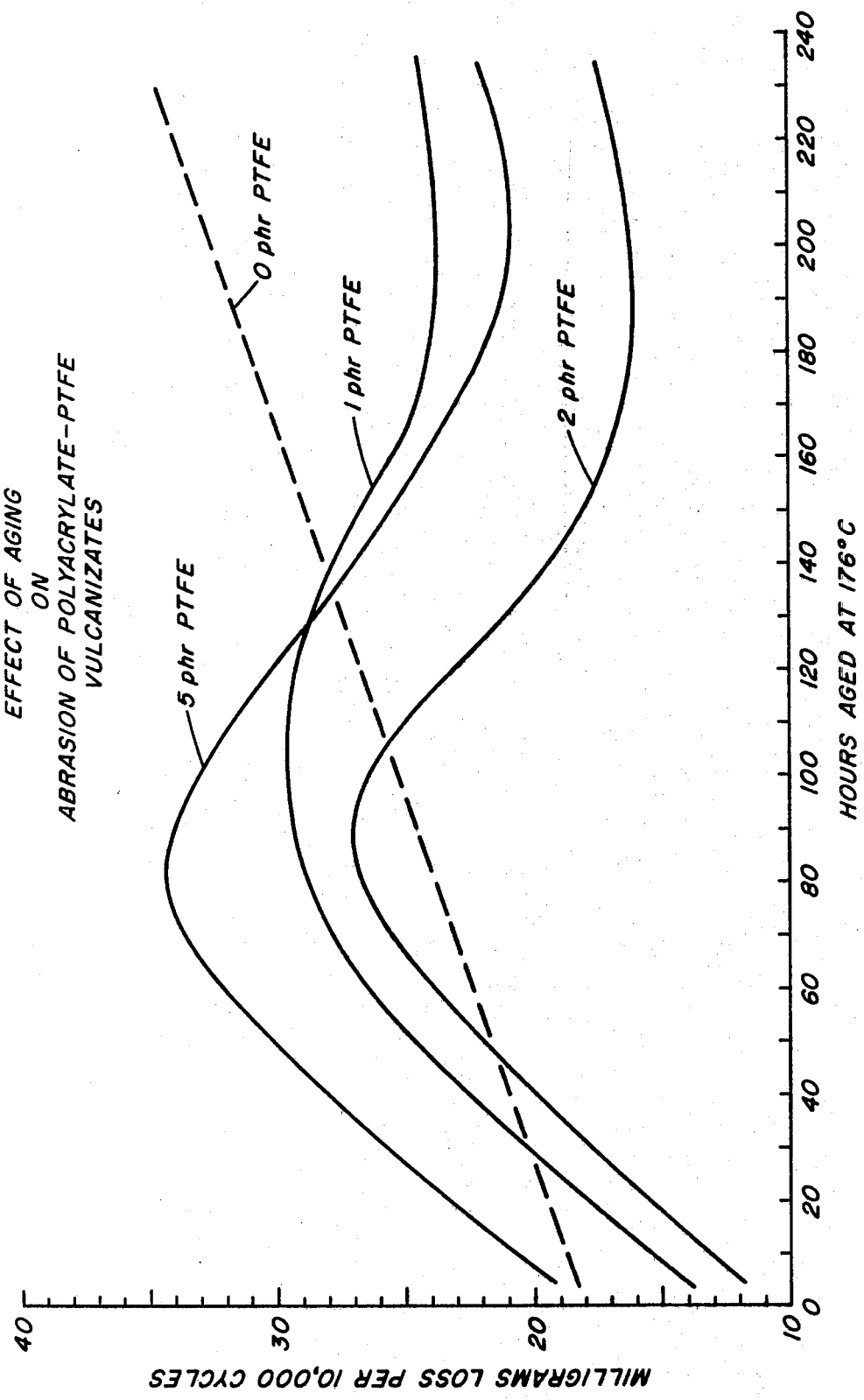

United States Patent [19]
Saxon et al.

[11] 4,096,207
[45] Jun. 20, 1978

[54] ELASTOMER COMPOSITIONS WITH IMPROVED ABRASION RESISTANCE

[75] Inventors: Robert Saxon, Princeton; Jack Horstmann Thelin, Somerville, both of N.J.

[73] Assignee: American Cyanamid Company, Stamford, Conn.

[21] Appl. No.: 756,296

[22] Filed: Jan. 3, 1977

[51] Int. Cl.² .................. C08L 9/02; C08L 13/00; C08L 31/04; C08L 63/10
[52] U.S. Cl. ................................. 260/900; 260/836; 260/890; 260/891
[58] Field of Search ............... 260/890, 900, 836, 891

[56] References Cited

U.S. PATENT DOCUMENTS

| | | | |
|---|---|---|---|
| 3,005,795 | 10/1961 | Busse et al. | 260/900 |
| 3,019,206 | 1/1962 | Robb | 260/900 |
| 3,294,871 | 12/1966 | Schmitt et al. | 260/900 |
| 3,325,434 | 6/1967 | Tully | 260/900 |
| 3,853,809 | 12/1974 | Martin et al. | 260/890 |

Primary Examiner—Allan Lieberman
Attorney, Agent, or Firm—Frank M. Van Riet

[57] ABSTRACT

Use of polytetrafluoroethylene (PTFE) to improve the abrasion resistance of elastomers and more particularly, elastomer compositions, containing fibrous PTFE, which exhibit improved resistance to abrasion, and to a method for improving the abrasion resistance of elastomers by the incorporation therein of fibrous PTEF.

8 Claims, 2 Drawing Figures

ELASTOMER COMPOSITIONS WITH IMPROVED ABRASION RESISTANCE

The present invention relates to the use of polytetrafluoroethylene (PTFE) to improve the abrasion resistance of elastomers. More particularly, it relates to elastomer compositions, containing fibrous PTFE, which exhibit improved resistance to abrasion, and to a method for improving the abrasion resistance of elastomers by the incorporation therein of fibrous PTFE.

Elastomers in general find many uses in which they are in dynamic contact with metals. In such applications, constant wear due to abrasion often results in premature failure of the elastomer composition. Of particular importance in this respect are automotive applications, notably shaft seals, transmission lip seals, transmission clutch seals, valve stem deflectors, and the like. There is a continuing search for better elastomers for use in an abrasive environment and for means to improve the abrasion resistance of existing elastomers.

It is a principal object of the present invention to provide elastomers with improved abrasion resistance. It is another object of the invention to provide a method for improving the abrasion resistance of elastomers.

In accordance with the aforementioned objectives, we have discovered that the incorporation of small amounts of fibrous PTFE into an elastomer composition results in improved abrasion resistance over a wide range of temperature, especially at elevated temperatures.

While the present invention generally relates to improvements in the abrasion resistance of elastomers, it is particularly directed to improvements in the abrasion resistance of acrylate and nitrile elastomers. The invention is especially directed towards improvements in the abrasion resistance of acrylate elastomers.

The invention has the surprising advantage that the incorporation of small amounts of PTFE into the elastomer provides substantial improvements in abrasion resistance, whereas incorporation of larger amounts, i.e. above about 5 parts per hundred parts of elastomer, results in reduced abrasion resistance. It is known that higher amounts of 10 parts or more of PTFE provide enhanced reinforcement of the elastomers, as evidenced by increased moduli at high elongations, an effect which is known and which has been demonstrated heretofore in other polymer compositions, notably certain thermoplastics. Thus, it is surprising that the abrasion resistance is improved by the incorporation of such low levels of PTFE. The results of the invention are made more surprising by the fact that PTFE itself exhibits quite poor abrasion resistance, as shown herein in the examples.

The invention has the further advantage that low levels of polytetrafluoroethylene provides improved modulus at low elongations, i.e. 10–50%.

Polytetrafluoroethylene, as used herein, means discrete particles of the polymer, for example as a powder, or an aqueous dispersion of the polymer. It also refers to PTFE powder obtained when an aqueous dispersion of the polymer is precipitated, using alcohol, filtered and dried. The PTFE may be incorporated into the elastomer as the dried powder, or it may be added, as an aqueous dispersion, to the rubber on a standard rubber mill or Banbury mixer, and the water evaporated from the rubber during mixing. It is convenient to add the polymer as an aqueous dispersion. Another technique is to form a masterbatch of elastomer and PTFE by incorporating a large amount, e.g. about 20 percent, of the polymer into the elastomer. Then, the appropriate amount of the masterbatch may be mixed on a mill with the raw elastomer to achieve the desired level of PTFE.

The amount of PTFE added to the elastomer to achieve the objects of the invention is in the range of about 1 to about 5 percent by weight, based on the elastomer, preferably about 1 to 4 percent, and still more preferably, about 2 percent. When less than about 1 percent is used, the improvement in abrasion resistance is minimal, whereas when the amount exceeds about 5 percent, the abrasion resistance is reduced. It will be understood, however, that the amount required for optimum results may vary depending on the particular elastomer.

It is important in achieving the enhanced abrasion resistance of the invention that the PTFE in the elastomer composition be in fibrous form. Whether the PTFE is in fibrous form, in any given sample of elastomer in which PTFE is incorporated, can be readily determined, for example, by electron microscope examination at magnifications of about 10,000 X, wherein the fibrillar network is clearly apparent when present. THe dry powder or dispersions of PTFE are not fibrous, but when subject to shear in the elastomer, for example during milling or Banbury mixing, the PTFE fibrillates and when fully incorporated into the elastomer forms the aforementioned fibrillar network.

Shear is achieved on a standard two-roll rubber mill in the "nip" between counter-rotating rolls, one turning faster than the other. The amount of shear depends partly on the nature of the elastomer, its Mooney viscosity and the temperature of milling. Thus, some elastomers have higher Mooney viscosity than others, although Mooney viscosities in the range 20–50 are conventional. Those elastomers with low Mooney viscosity may have to be milled at low temperature to achieve a suitable degree of shear; some may even require a cold mill. Of course, the mechanical work on the elastomer during milling will raise the temperature of the elastomer. Elastomers with high Mooney viscosity may require higher milling temperatures because they are too tough to mill at low temperature. However, it will be obvious to those skilled in the rubber art how to achieve the needed shear to achieve fibrillation of the polytetrafluoroethylene, since, in general, a viscous melt of elastomer having a consistency suitable for conventional rubber compounding will also be suitable for convenient fibrillation of PTFE dispersed in the elastomer.

The elastomers which may be improved in accordance with the invention are butadieneacrylonitrile (NBR) and polyacrylate elastomers. Preferred elastomers are polyacrylate elastomers, and nitrile rubbers (NBR).

Particularly preferred elastomers are the polyacrylate elastomers prepared by a free-radical initiated polymerization of a major proportion of one or more esters of acrylic acid, optionally one or more vinyl monomers copolymerizable therewith in minor amounts, such as acrylonitrile or styrene, and a minor proportion of a vinyl monomer containing an active halogen atom, e.g. vinyl chloroacetate or vinyl 2-chloroethyl ether. Polymers may also be made containing minor amounts of a vinyl monomer having an epoxy group, such as allyl glycidyl ether. Preferred acrylic elastomers include copolymers of an alkyl acrylate, particularly lower alkyl acrylates and copolymers of one or more lower alkyl acrylates with other compatible acrylate monomers, including alkoxyalkyl acrylates, thioalkyl acrylates, alkylthioalkyl acrylates, alkoxythioalkyl acrylates, cyanoalkyl acrylates, cyanoalkoxyalkyl acrylates and cyanothioalkyl acrylates. The copolymers preferably contain minor amounts of vinyl chloroacetate. Such elastomers are described by Vial, "Recent Developments in Acrylic Elastomers," Rubber Chem. & Tech. 44, 344-362 (1971); see also, Kaizerman, U.S. Pat. Nos. 3,201,373, and Aloia et al, 3,397,193.

The elastomers are compounded in conventional manner and may include, in addition to the PTFE, fillers such as carbon black and silica; plasticizers; lubricants; antioxidants; accelerators; sulfur; zinc oxide, and the like. As described hereinabove, the PTFE is not a reinforcing filler at the levels used, except to the extent that it improves the moduli at low elongations. It is emphasized, however, that at higher levels, e.g. 10–20 percent by weight, it does significantly enhance the stress-strain properties of the elastomer composition. In such cases, however, the abrasion resistance is diminished. Moreover, although the compositions of the invention may contain a filler, such as carbon black, the filler is not necessary to achieve fibrillation of the PTFE, which may be incorporated into the elastomer before or after the filler is added.

The compounded elastomers may be cured or vulcanized in conventional manner, for example, by compression molding at elevated temperatures.

The abrasion resistance of the elastomer compositions of the invention is determined in accordance with the method and apparatus described by Thelin, "Laboratory Measurement of Abrasion Resistance Using a Free Flowing Abrasive", Rubber Chem. & Tech. 43, 1503-1514 (1970).

Mooney viscosity (ML-4) is defined in ASTM D1646.

The invention is more completely described in the Examples which follow.

EXAMPLE 1

A copolymer elastomer, prepared by copolymerizing 94 parts by weight of ethylacrylate and 6 percent by weight of vinylchloroacetate, and having a Mooney viscosity (ML-4) at 100° C of 49, was compounded on a standard two-roll rubber mill with the ingredients shown in Table I.

Table I

| | Parts By Weight | | | |
|---|---|---|---|---|
| | A | B | C | D |
| Elastomer | 100 | 100 | 100 | 100 |
| Stearic acid | 1 | 1 | 1 | 1 |
| Antioxidant (a) | 2 | 2 | 2 | 2 |
| Carbon black | 60 | 60 | 60 | 60 |
| Sodium 2-ethylhexanoate (b) | 8 | 8 | 8 | 8 |
| Sulfur | 0.25 | 0.25 | 0.25 | 0.25 |
| Polytetrafluoroethylene (c) (real) | 1 | 2 | 5 | — |

(a) Di-β-naphthyl-p-phenylenediamine
(b) 50% active on an inert carrier
(c) As a 60% dispersion in water The compositions were compression molded into abrasion blocks by heating for 20 minutes at 165° C. All of the abrasion blocks were post-cured for 16 hours at 150° C. Some were additionally aged at 176° C for periods of time shown in Table 2 prior to testing. The abrasion resistance of all samples was then determined in accordance with the method of Thelin, described hereinabove. Results are reported as milligrams lost per 10,000 cycles.

Table II

| | Abrasion Resistance Milligrams loss per 10,000 Cycles | | |
|---|---|---|---|
| Elastomer Sample | A | B | C |
| Post-cured, unaged | 13 | 10.9 | 17.5 |
| Aged at 176° C for | | | |
| 72 hours | 28.5 | 27.4 | 37 |
| 141 hours | 28.0 | 15.8 | 26.3 |
| 160 hours | 25.0 | 18.0 | 24.5 |
| 180 hours | 24.1 | 17.6 | 18.2 |
| 200 hours | 23.8 | 14.2 | 23.0 |
| 244 hours | 24.7 | 20.3 | 23.3 |

FIG. 1 graphically depicts the data shown in Table II. It is evident from FIG. 1 that Composition B, containing 2 pph of polytetrafluoroethylene, is more abrasion resistant than either the control or Compositions A or C. It is also evident that the compositions containing polytetrafluoroethylene exhibit improved abrasion resistance with aging beyond about 100 hours at 176° C. This reversal of the tendency to abrade after extended aging is totally unexpected.

EXAMPLE 2

The procedure of Example 1 was followed using 1, 2, 5, 10 and 20 parts polytetrafluoroethylene per hundred parts of elastomer. Abrasion results are shown in Table III.

Table III

| | Abrasion Resistance (Milligrams loss/10,000 cycles) | |
|---|---|---|
| % PTFE | Unaged | Aged |
| 0 | 24, 19 | — |
| 1 | 13 | 28.5 |
| 2 | 11.5 | 27.5 |
| 5 | 18 | 37 |
| 10 | 31.2 | — |
| 20 | 45 | — |

Figure 2:
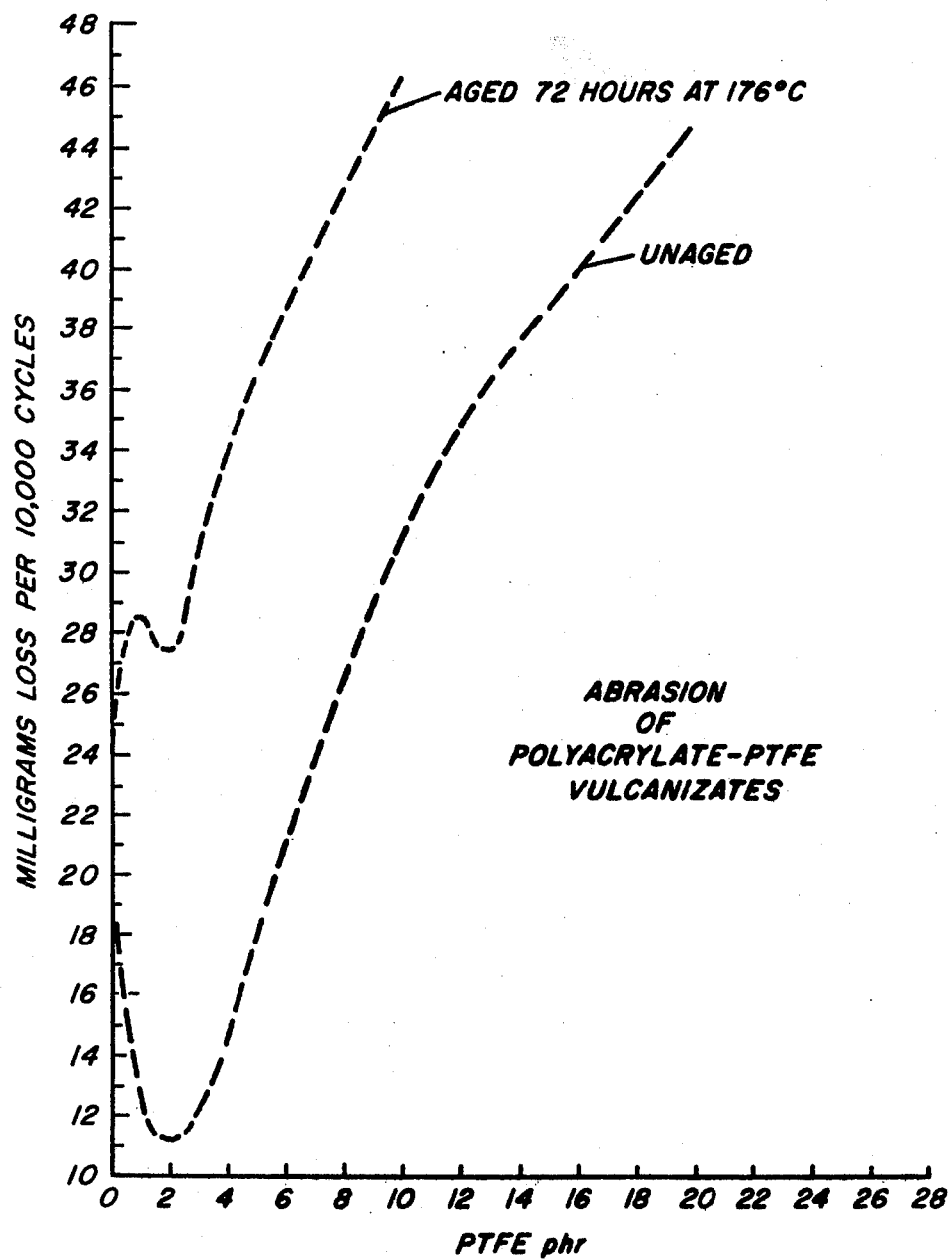

The data in Table III are depicted graphically in FIG. 2. The optimum improvement in abrasion resistance is clearly shown at about 2 percent polytetrafluoroethylene, whether the elastomer compositions are unaged or aged. It is also apparent that levels of polytetrafluoroethylene exceeding about 5 percent have an adverse effect on abrasion resistance.

EXAMPLE 3

Several acrylate elastomers were compounded with 2 percent PTFE and cured as described in Example 1. All samples were post-cured for 16 hours at 150° C before testing. Stress-strain properties are shown in Table IV versus a similar composition containing no PTFE.

Table IV

| | Percent PTFE | | | | | |
|---|---|---|---|---|---|---|
| | I | II | III | IV | V | VI |
| Elastomer A (1) | 0 | 2 | — | — | — | — |
| Elastomer B (2) | — | — | 0 | 2 | — | — |
| Elastomer C (3) | — | — | — | — | 0 | 2 |
| | Stress-Strain Properties | | | | | |
| Shore A hardness | 77 | 80 | 86 | 88 | 85 | 85 |
| Modulus, psi, at | | | | | | |
| 10% | 23 | 50 | 70 | 70 | 57 | 87 |
| 20% | 110 | 177 | 240 | 287 | 220 | 275 |
| 30% | 173 | 257 | 403 | 430 | 412 | 447 |
| 100% | 887 | 864 | 1667 | 1468 | — | — |
| Tensile, psi | 1505 | 1500 | 1937 | 1835 | 1625 | 1653 |

Table IV-continued

| Elongation, % | 182 | 200 | 135 | 153 | 85 | 95 |

(1) Copolymer of 94 wt. % of a mixture of 82% ethyl acrylate and 18% butyl acrylate with 6 wt. % vinyl chloroacetate.
(2) Copolymer of 94 wt. % ethyl acrylate and 6 wt. % vinyl chloroacetate.
(3) Copolymer of 94 wt. % of a mixture of 42% ethyl acrylate, 28% butyl acrylate, and 23% methoxyethyl acrylate with 6 wt. % vinyl chloroacetate, copolymerized in presence of 1% by weight polybutadiene.

The data in Table IV illustrate the improvement in the moduli at low extensions resulting from the incorporation of 2 percent PTFE into the compositions.

EXAMPLE 4

Following the procedure of Example 1 compositions were prepared containing 10 and 20 weight percent PTFE. Stress-strain properties are shown in Table V.

Table V

|  | % Polytetrafluoroethylene | | |
|---|---|---|---|
|  | 0 | 10 | 20 |
| Modulus, psi at |  |  |  |
| 10% | 80 | 675 | 1375 |
| 20% | 120 | 860 | 1725 |
| 30% | 150 | 1035 | 2085 |
| 50% | — | 1305 | 2520 |
| 100% | 885 | 1985 | 2740 |
| Tensile, psi | 1980 | 2275 | 2780 |
| Elongation, % | 245 | 158 | 123 |

The data in Table V illustrates the enhanced reinforcing effect of high levels of PTFE, as evidenced by the increased modulus and tensile strength of compositions containing 10% and 20% PTFE. However, as shown hereinabove, these levels of PTFE have an adverse effect on abrasion resistance.

EXAMPLE 5

A commercial polytetrafluoroethylene sheet about ¼ inch thick was subjected to abrasion in the manner described. In three separate tests samples showed losses of 136, 172.5 and 135 milligrams per 10,000 cycles, indicating that polytetrafluoroethylene exhibits poor resistance to abrasion.

EXAMPLE 6

A butadiene-acrylonitrile elastomer (Hycar 1042) was compounded as follows:

|  | Parts by Weight | |
|---|---|---|
|  | A | B |
| Elastomer | 100.0 | 100.0 |
| Mercaptobenzothiazyldisulfide | 1.5 | 1.5 |
| Carbon black | 60.0 | 60.0 |
| Sulfur | 1.5 | 1.5 |
| Zinc oxide | 5.0 | 5.0 |
| Stearic acid | 1.5 | 1.5 |
| Polytetrafluoroethylene | 0 | 1.3 |

The composition was cured for 45 minutes at 150° C and aged for 16 hours at 150° C. Abrasion results in grams loss per 10,000 cycles are given below.

|  | A | B |
|---|---|---|
| Modulus, psi at 50% | 225 | 277 |
| at 100% | 427 | 536 |
| Hardness, Shore A | 72 | 72 |
| Abrasion | 1.5 | 0.9 |

We claim:
1. A composition of matter comprising a vulcanizable polyacrylate elastomer containing from about 1 to 4 parts per hundred parts thereof of particulate polytetrafluoroethylene in fibrous form.
2. A composition according to claim 1 wherein said polyacrylate elastomer is a copolymer of a major proportion of one or more esters of acrylic acid and a minor proportion of an active halogen containing vinyl monomer.
3. A composition according to claim 2 wherein said active halogen containing vinyl monomer is vinyl chloroacetate.
4. A method for improving the abrasion resistance of vulcanizable elastomer as in claim 1, which comprises incorporating into said elastomer from about 1 to 5 parts, per hundred parts thereof, of particulate non-fibrous polytetrafluoroethylene and subjecting said elastomer and polytetrafluoroethylene to conditions of high shear, such that the resulting elastomer composition contains said polytetrafluoroethylene in fibrous form.
5. A method as in claim 4 wherein said non-fibrous polytetrafluoroethylene is in the form of an aqueous dispersion or dry powder.
6. The method of claim 4 wherein said polyacrylate elastomer is a copolymer of a major proportion of one or more esters of acrylic acid and a minor proportion of an active halogen containing vinyl monomer.
7. The method of claim 6 wherein said active halogen containing vinyl monomer is vinyl chloroacetate.
8. An abrasion resistant elastomer composition resulting when the composition of claim 4 is vulcanized.

* * * * *